United States Patent
Lin (10) Patent No.: US 12,316,909 B2
(45) Date of Patent: May 27, 2025

(54) METHOD FOR DASH MEDIA STREAMING, ELECTRIC DEVICE AND STORAGE MEDIUM

(71) Applicant: WANGSU SCIENCE & TECHNOLOGY CO., LTD., Shanghai (CN)

(72) Inventor: Xiaoqiang Lin, Shanghai (CN)

(73) Assignee: WANGSU SCIENCE AND TECHNOLOGY CO., LTD., Shanghai (CN)

( * ) Notice: Subject to any disclaimer, the term of this patent is extended or adjusted under 35 U.S.C. 154(b) by 302 days.

(21) Appl. No.: 18/180,121

(22) Filed: Mar. 7, 2023

(65) Prior Publication Data

US 2023/0224534 A1 Jul. 13, 2023

Related U.S. Application Data

(63) Continuation of application No. PCT/CN2021/117282, filed on Sep. 8, 2021.

(30) Foreign Application Priority Data

Aug. 13, 2021 (CN) .......................... 202110931822.1

(51) Int. Cl.
*H04N 21/44* (2011.01)
*H04N 21/239* (2011.01)
(Continued)

(52) U.S. Cl.
CPC ... *H04N 21/44012* (2013.01); *H04N 21/2393* (2013.01); *H04N 21/437* (2013.01); *H04N 21/643* (2013.01); *H04N 21/85406* (2013.01)

(58) Field of Classification Search
CPC ............. H04N 21/2393; H04N 21/437; H04N 21/44012; H04N 21/643; H04N 21/85406
See application file for complete search history.

(56) References Cited

U.S. PATENT DOCUMENTS

2012/0185607 A1* 7/2012 Rhyu ...................... H04L 67/02 709/231
2012/0233345 A1* 9/2012 Hannuksela ....... H04N 21/8456 709/231
(Continued)

FOREIGN PATENT DOCUMENTS

| CN | 111510790 A | 8/2020 |
| CN | 112738201 A | 4/2021 |

(Continued)

OTHER PUBLICATIONS

R. Fielding, et al., Hypertext Transfer Protocol-HTTP/1.1, IETF (Internet Engineering Task Force) RFC 2616, Jun. 1999, 143 pgs.
(Continued)

*Primary Examiner* — Nicholas T Corbo
(74) *Attorney, Agent, or Firm* — USCH Law, PC (57) ABSTRACT

Embodiments of the present disclosure relate to communication technology. A method for DASH media streaming, an electronic device and a storage medium are provided. A first MPD file, a media initialization file, and a first media slice file of a DASH media stream to be played are acquired from a server by sending at most two acquisition requests to the server. The media initialization file and the first media slice file are acquired through one of the at most two acquisition requests. Subsequent MPD files are requested from the server according to the first MPD file, and other media slice files in addition to the first media slice file are acquired from the server according to the subsequent MPD files.

20 Claims, 8 Drawing Sheets

(51) Int. Cl.
*H04N 21/437* (2011.01)
*H04N 21/643* (2011.01)
*H04N 21/854* (2011.01)

(56) References Cited

U.S. PATENT DOCUMENTS

| | | | |
|---|---|---|---|
| 2014/0325018 A1 | 10/2014 | Ai et al. | |
| 2015/0296274 A1* | 10/2015 | Good | H04N 21/8456 725/93 |
| 2016/0261664 A1 | 9/2016 | Lotfallah et al. | |
| 2018/0192102 A1 | 7/2018 | Ma et al. | |

FOREIGN PATENT DOCUMENTS

| | | | | |
|---|---|---|---|---|
| GB | 2516112 A | | 1/2015 | |
| GB | 2582034 A | * | 9/2020 | ......... H04N 21/2353 |
| TW | 202046733 A | | 12/2020 | |
| WO | 2015032032 A1 | | 3/2015 | |
| WO | WO-2017202373 A1 | * | 11/2017 | ............ H04L 65/75 |
| WO | 2020182526 A1 | | 9/2020 | |
| WO | 2021001136 A1 | | 1/2021 | |
| WO | 2021067768 A1 | | 4/2021 | |

OTHER PUBLICATIONS

M. Belshe, et al., Hypertext Transfer Protocol Version 2(HTTP/2): IETF (Internet Engineering Task Force) RFC 7540, May 2015, 96 pgs.

Fette, et al., The WebSocket Protocal, IETF RFC 6455, Dec. 2011, 71 pgs.

Wangsu Science & Technology Co., Ltd., CN First Office Action with English translation, CN 202110931822.1, May 7, 2022, 19 pgs.

Wangsu Science & Technology Co., Ltd., International Search Report with English translation, PCT/CN2021/117282, May 9, 2022, 6 pgs.

Wangsu Science & Technology Co., Ltd., Extended European Search Report, EP 21953259.5, Sep. 19, 2024, 9 pgs.

\* cited by examiner

METHOD FOR DASH MEDIA STREAMING, ELECTRIC DEVICE AND STORAGE MEDIUM

CROSS-REFERENCE TO RELATED APPLICATION

The present application is a continuation of PCT Patent Application No. PCT/CN2021/117282, filed Sep. 8, 2021, which claims priority to Chinese patent application No. 202110931822.1, filed Aug. 13, 2021, each of which is incorporated by reference herein in its entirety.

TECHNIC FIELD

Embodiments of the present disclosure relate in general to communication technology, and more particularly to a method for DASH media streaming, an electronic device and a storage medium.

BACKGROUND

Dynamic adaptive streaming over HTTP (DASH) is an adaptive streaming method based on HTTP.

Streaming media based on a DASH protocol contains a media presentation description (MPD) file and a series of media slice files. The MPD file is configured to describe characteristics of streaming media data and includes a method of acquiring all media slice files for storing the media data and effective time periods. The MPD file is similar to a m3u8 file of an HTTP live streaming (HLS) protocol, which is configured to represent a playlist of media files, except that the MPD file is in standard xml format and is more readable.

In the DASH protocol, the media slice files are encapsulated in MP4 format. Compared with is file encapsulation of the HLS protocol, MP4 file encapsulation is simpler, which includes different boxes (each box is an independent structure) and has good scalability, so that the MP4 file encapsulation is more and more favored by more streaming media manufacturers.

The DASH protocol separately places decoding information of respective audio-video headers in respective audio-video initialization files, i.e., init.mp4 files, so that there is no need for each media slice file to carry the decoding information of the audio-video header, which makes the media slice files be more lightweight. However, a disadvantage of such a DASH protocol is that, when rendering a first frame, a first MPD file needs to be requested first, and then the init.mp4 files containing the decoding information of the audio-video headers need to be requested respectively, and finally the audio-video media slice files need to be requested respectively, so that the rendering of the first frame is able to be started, resulting in high delay of rendering the first frame and poor playing effect of a client.

SUMMARY

Some embodiments of the present disclosure provide a method for DASH media streaming, electronic device and a storage medium, which can effectively reduce delay of rendering of the first frame, improve playing effect of media streams of the client, and reduce transformation cost of conventional acquisition methods.

To solve the above technical problems, embodiments of the present disclosure provide a method for DASH media streaming, applied at a client, including the following operations.

A first media presentation description (MPD) file, a media initialization file, and a first media slice file of a DASH media stream to be played are acquired from a server by sending at most two acquisition requests to the server. The media initialization file and the first media slice file are requested through one of the at most two acquisition requests.

Subsequent MPD files are requested from the server according to the first MPD file, and other media slice files in addition to the first media slice file are acquired from the server according to the subsequent MPD files.

Compared with the existing technologies, during the client acquires DASH media streams for live data playing, the client first acquires the first MPD file, the media initialization file and the first media slice file of a DASH media stream to be played from the server by sending at most two acquisition requests to the server, so as to quickly obtain data of files required for rendering the first frame of the DASH media stream, thereby supporting the play operation of the client on media data of the first frame. Then, subsequent MPD files are requested from the server according to the first MPD file, and other media slice files in addition to the first media slice file are acquired from the server according to the subsequent MPD files, so as to implement the acquisition of the subsequent DASH media stream data, thereby supporting the play operation of the client on media data of non-first frames. In this technical solution, all the data required to render the first frame of the DASH media stream is quickly requested via a relatively small number of requests, so as to reduce the delay of rendering the first frame and improve the playing effect of the media streams of the client. Meanwhile, with the first MPD file, conventional DASH media stream acquisition methods are still able to be used, and other media slice files in addition to the first media slice file are acquired according to the subsequent acquired MPD files, so that transformation cost of the conventional acquisition methods are reduced.

In some embodiments, acquiring the first MPD file, the media initialization file, and the first media slice file of the DASH media stream to be played from the server by sending the at most two acquisition requests to the server includes: acquiring the first MPD file from the server by sending a first MPD request to the server; and acquiring a first initialization file from the server by sending a first media initialization file request to the server. The first initialization file is an MP4 format file including contents of the media initialization file and the first media slice file. Three types of files are obtained by sending two acquisition requests.

In some embodiments, the first initialization file includes two box structures that respectively store the contents of the media initialization file and the first media slice file.

In some embodiments, acquiring the first MPD file, the media initialization file, and the first media slice file of the DASH media stream to be played from the server by sending the at most two acquisition requests to the server includes: acquiring a second initialization file from the server by sending a second media initialization request to the server, wherein the second initialization file is an MP4 format file including contents of the first MPD file, the media initialization file, and the first media slice file. Three types of files are obtained by sending one acquisition request.

In some embodiments, the second initialization file includes three box structures that respectively store the contents of the first MPD file, the media initialization file, and the first media slice file.

In some embodiments, requesting subsequent MPD files from the server according to the first MPD file, and acquiring other media slice files in addition to the first media slice file from the server according to the subsequent MPD files includes: acquiring, starting from the first MPD file, a next MPD file from the server according to a second MPD request sent to the server based on a currently acquired MPD file; and sending a media file request to the server according to the currently acquired MPD file to acquire, from the server, other media slice files to which the currently acquired MPD file is directed, in addition to the first media slice file. A request is sent to the server to acquire the next MPD file based on the acquired previous MPD file, and each media slice file is acquired according to the MPD file acquired each time, thereby completing subsequent acquisition of the media files to be played.

In some embodiments, a play operation is performed on the first media slice file based on the media initialization file after acquiring the media initialization file and the first media slice file, thereby realizing a quick play operation on the first media slice file.

In some embodiments, play operations on the other media slice files are performed based on the media initialization file after acquiring the other media slice files, thereby realizing a quick play operation on the non-first media slice file.

Embodiments of the present disclosure provide another method for DASH media streaming, applied at a server, including the following operations.

A media initialization file is generated for a DASH media stream pushed to the server.

The DASH media stream is sliced to form a plurality of media slicing files.

In response to receiving a first acquisition request sent by a client for requesting the DASH media stream, a first MPD file is provided to the client is generated.

In response to receiving at most two acquisition requests from the client, the first MPD file, the media initialization file, and a first media slice file corresponding to the first MPD file are fed back to the client as a response result. The media initialization file and the first media slice file are sent as a response result of one of the at most two acquisition requests.

Subsequent MPD files requested by the client based on the first MPD file, and other media slice files in addition to the first media slice file requested by the client based on the subsequent MPD files are sent to the client.

Compared with the existing technologies, the server generates the media initialization file and the media slice files for the DASH media stream pushed to the local. When the first acquisition request sent by the client for requesting the DASH media stream is received, the first MPD file provided to the client is generated, and the first MPD file, the media initialization file, and the first media slice file corresponding to the first MPD file are fed back to the client as a response result in response to receiving at most two acquisition requests from the client, so that the client is able to quickly obtain data of files required for rendering the first frame of the DASH media stream, thereby supporting the play operation of the client on media data of the first frame. Then, subsequent MPD files requested by the client based on the first MPD file and other media slice files in addition to the first media slice file which are requested by the client according to the subsequent MPD files are sent to the client, so as to implement a process of providing subsequent DASH media stream data to the client, thereby supporting the play operation of the client on media data of the non-first frame. In this technical solution, all the data required to render the first frame of the DASH media stream is quickly fed back to the client based on a relatively small number of requests, so as to reduce the delay of rendering the first frame and improve the playing effect of the media streams of the client. Meanwhile, with the first MPD file, conventional DASH media stream acquisition methods are still able to be used, and the client sends other media slice files in addition to the first media slice file to the client according to the requests initiated by the client based on the acquired MPD files, so that transformation cost of the conventional acquisition methods are reduced.

In some embodiments, the first acquisition request is a first MPD request, and feeding back the first MPD file, the media initialization file, and the first media slice file corresponding to the first MPD file to the client as the response result in response to receiving at most two acquisition requests from the client includes: feeding back the first MPD file to the client as a first response result in response to receiving the first MPD request from the client; and feeding back a first initialization file to the client as a second response result in response to receiving a first media initialization request from the client, wherein the first initialization file is an MP4 format file including contents of the media initialization file and the first media slice file. Three types of files are provided to the client by receiving two acquisition requests.

In some embodiments, after receiving the first media initialization request from the client, the method further includes: constructing the first initialization file, wherein the first initialization file includes two box structures that respectively store the contents of the media initialization file and the first media slice file.

In some embodiments, the first acquisition request is a second media initialization request, and feeding back the first MPD file, the media initialization file, and the first media slice file corresponding to the first MPD file to the client as the response result in response to receiving at most two acquisition requests from the client includes: feeding back a second initialization file to the client as a first response result in response to receiving the second media initialization request from the client, wherein the second initialization file is an MP4 format file including contents of the first MPD file, the media initialization file, and the first media slice file. Three types of files are provided to the client by receiving one acquisition request.

In some embodiments, after receiving the second media initialization request from the client, the method further includes: constructing the second initialization file, wherein the second initialization file includes three box structures that respectively store the contents of the first MPD file, the media initialization file, and the first media slice file.

In some embodiments, sending to the client subsequent MPD files requested by the client based on the first MPD file and other media slice files in addition to the first media slice file requested by the client based on the subsequent MPD files includes: sending, starting from the first MPD file, a next MPD file to the client according to a second MPD request sent by the client based on a currently acquired MPD file; and sending to the client other media slice files to which the currently acquired MPD file is directed, in addition to the first media slice file, based on a media file request sent by the client according to the currently acquired MPD file. By receiving the MPD request sent by the client based on a previously acquired MPD file, a next MPD file is provided to the client, and non-first media slice files are sent to the client according to each request for the media slice file sent by the client based on each acquired MPD file, thereby implementing a process of providing subsequent DASH media stream data to the client.

Embodiments of the present disclosure further provide an electronic device, including the following components.

At least one processor.

A memory communicatively coupled to the at least one processor.

The memory stores instructions executable by the at least one processor, and the instructions when executed by the at least one processor enable the at least one processor to perform the following methods.

That is, the method for DASH media streaming according to the above embodiments in which the electronic device serves as a client. Alternatively, the method for DASH media streaming according to the above embodiments in which the electronic device serves as a server.

Embodiments of the present disclosure further provide a computer-readable storage medium storing a computer program that, when executed by at least one processor, performs the method for DASH media streaming according to the above embodiments, or another method for DASH media streaming according to the above embodiments.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings are represented as similar elements, and the figures in the accompanying drawings do not constitute a proportion limitation unless otherwise stated.

DETAILED DESCRIPTION OF THE EMBODIMENTS

In order to make the objectives, technical solutions and advantages of the embodiments of the present disclosure clearer, various embodiments of the present disclosure are described in detail below with reference to the accompanying drawings. Those of ordinary skill in the art should appreciate that many technical details have been proposed in various embodiments of the present disclosure for the reader to better understand the present disclosure. However, the technical solutions claimed in the present disclosure is able to be realized even without these technical details and various changes and modifications based on the following embodiments.

Figure 1:
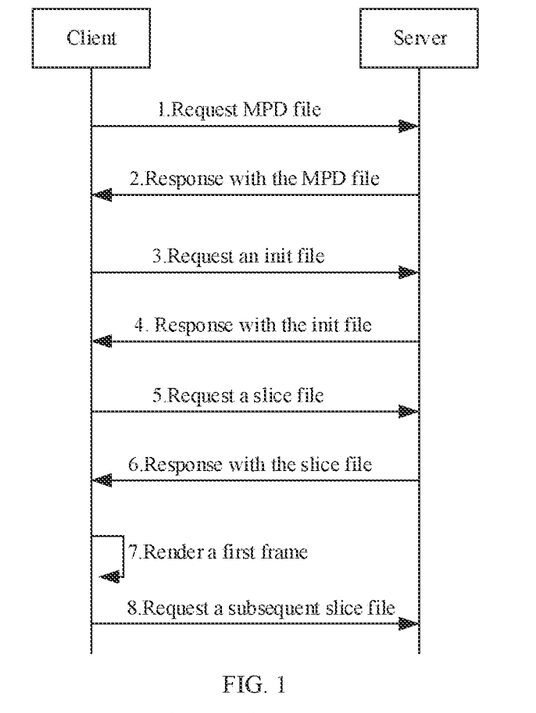
FIG. 1 is a signaling flowchart of a conventional method for DASH media streaming.

Referring to a signaling flowchart of a conventional method for DASH media streaming shown in FIG. 1, media streaming over a DASH protocol has the following characteristic, i.e., media initialization files (e.g., init files) respectively including decoding information of audio-video headers are separated from audio-video slice files (referred to as "media slice files"). That is, a playing procedure of a media stream is as follows: 1. the client first requests a stream.mpd file (i.e., the "first MPD file"), 3. then respectively requests a stream_video_init.mp4 file (i.e., the init file of the video) and a stream_audio_init.mp4 file (i.e., the init file of the audio), 5. and then requests corresponding video slice files and audio slice files, such as video-1.mp4, audio-1.mp4, video-2.mp4, audio-2.mp4 . . . , respectively, according to the content of the first MPD file. In other words, the client needs five HTTP requests to render the first frame of the DASH media stream, which causes high delay of rendering the first frame and poor playing effect of the client.

In order to solve the problem, the present disclosure simplifies the acquisition process of the first frame data of the DASH media stream by the client. When requesting the DASH media stream for the first time, the client reduces the process of requesting the first MPD file, the media initialization file, and the first media slice file to complete the acquisition by sending at most two acquisition requests, thereby reducing the number of interactions between the client and the server, and enabling the client to quickly obtain all the data of rendering of the first frame so as to complete local playing. After the above three kinds of data are acquired, the conventional media stream acquisition method is used for media slice files to be subsequently acquired. The subsequent MPD files are acquired according to the first MPD file, and then corresponding media slice files are acquired according to the MPD file acquired each time, so as to realize the connection with the conventional method and reduce technical transformation of the conventional method.

Figure 2:
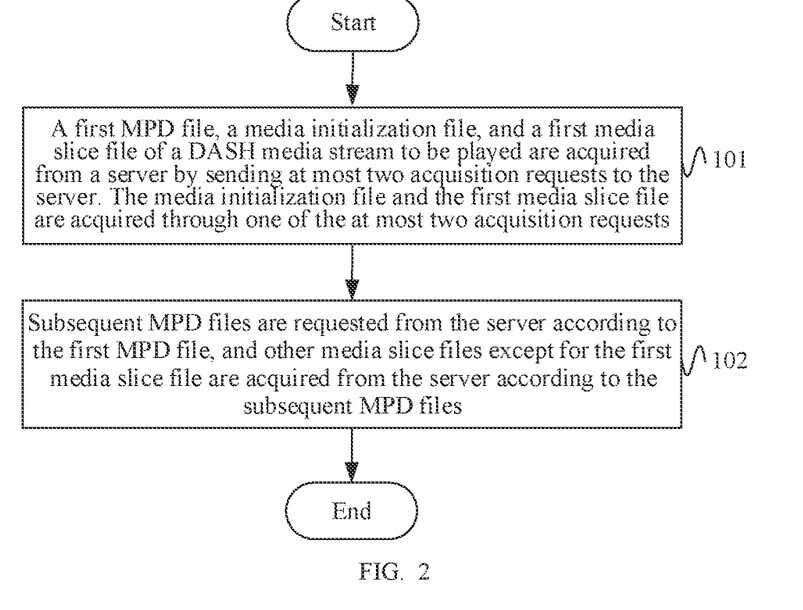
FIG. 2 is a specific flowchart of a method for DASH media streaming according to a first embodiment of the present disclosure.

A first embodiment of the present disclosure relates to a method for DASH media streaming applied at a client. As shown in FIG. 2, the method includes the following operations.

At 101, a first MPD file, a media initialization file, and a first media slice file of a DASH media stream to be played are acquired from a server by sending at most two acquisition requests to the server. The media initialization file and the first media slice file are acquired through one of the at most two acquisition requests.

The first MPD file is a first MPD file of the DASH media stream requested by the client. The media initialization file is an init file of the DASH media stream, encapsulated in MP4 format, and contains necessary information for playing the media slice file, for example, decoding information of an audio-video header. The first media slice file is a first audio-video slice file of the DASH media stream requested by the client. The first MPD file corresponds to the first media slice file, and the first MPD file at least includes media presentation description information of at least one media slice file including the first media slice file.

Specifically, when the client requests the server for playing the DASH media stream, the conventional method (i.e., it takes five HTTP requests to get all the data used to render the first frame) is simplified, and a method of acquiring the first MPD file, the media initialization file, and the first media slice file from the server by sending at most two acquisition requests is used. The media initialization file and the first media slice file are acquired through one acquisition request. Accordingly, based on the requests from the client, the server carries the three types of data in a response result by the same number of responses as the number of acquisition requests. For example, when the server feeds back both the media initialization file and the first media slice file to the client as one response result, the two files are concatenated, and then the concatenated file is carried in the response.

In this embodiment, an order of acquiring the above three types of files by at most two acquisition requests is not limited. In a conventional DASH media streaming process, the MPD file is encapsulated in xml format, and the media initialization file and media slice file are encapsulated in MP4 file. Based on this, the three types of files are able to be concatenated and reorganized in this embodiment according to the encapsulation formats of these three types of files in combination with actual needs, so as to be provided to the client by the response corresponding to the at most two acquisition requests.

In fact, the client starts to render the first frame of the DASH media stream immediately after obtaining the media initialization file and the first media slice file, thereby reducing the delay of rendering the first frame and improving the playing effect of the client.

At 102, subsequent MPD files are requested from the server according to the first MPD file, and other media slice files in addition to the first media slice file are acquired from the server according to the subsequent MPD files.

Specifically, the client selects, according to the progress of playing a local DASH media stream, an appropriate timing to acquire MPD files required to be subsequently acquired according to the first MPD file. For example, based on names and/or file numbers of media slice files included in the first MPD file, a MPD file including names and/or file numbers of subsequent media slice files is requested from the server. Then, corresponding media slice files in addition to the first media slice file are acquired from the server based on each acquired MPD file.

Compared with the existing technologies, in this embodiment, during the client acquires DASH media streams for live data playing, the client first acquires the first MPD file, the media initialization file and the first media slice file of a DASH media stream to be played from the server by sending at most two acquisition requests to the server, so as to quickly obtain data of files required for rendering the first frame of the DASH media stream, thereby supporting the play operation of the client on media data of the first frame. Then, subsequent MPD files are requested from the server according to the first MPD file, and other media slice files in addition to the first media slice file are acquired from the server according to the subsequent MPD files, so as to implement the acquisition of the subsequent DASH media stream data, thereby supporting the play operation of the client on media data of non-first frames. In this technical solution, all the data required to render the first frame of the DASH media stream is quickly requested via a relatively small number of requests, so as to reduce the delay of rendering the first frame and improve the playing effect of the media streams of the client. Meanwhile, with the first MPD file, conventional DASH media stream acquisition methods are still able to be used, and other media slice files in addition to the first media slice file are acquired according to the subsequent acquired MPD files, so that transformation cost of the conventional acquisition methods are reduced.

Figure 3:
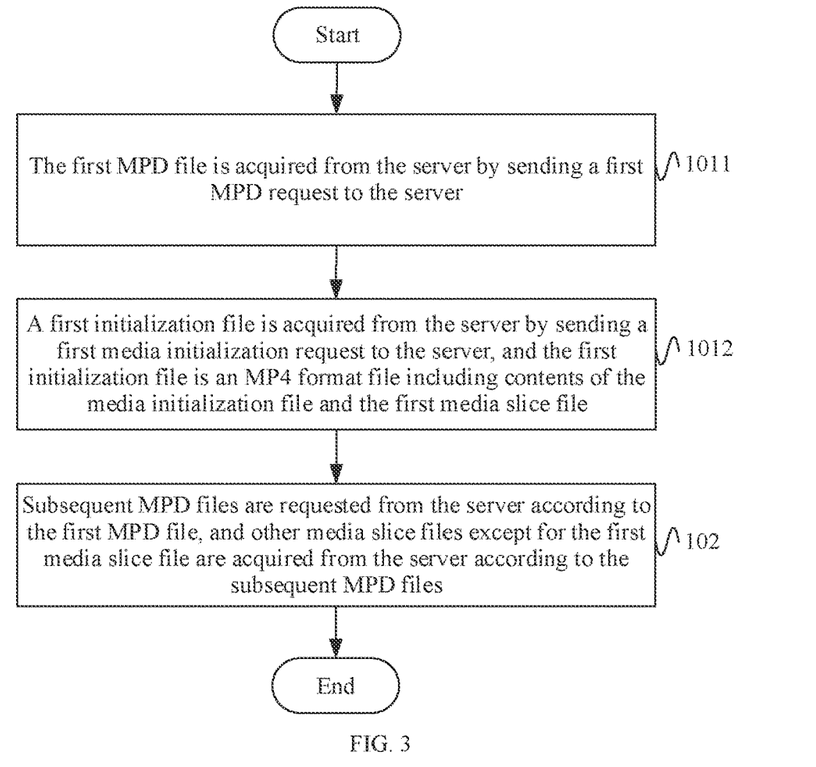
FIG. 3 is a specific flowchart of a method for DASH media streaming according to a second embodiment of the present disclosure.

FIG. 3 is a specific flowchart of a method for DASH media streaming according to a second embodiment of the present disclosure. The second embodiment is an improvement based on the first embodiment in that the client acquires the first MPD file, the media initialization file, and the first media slice file of the DASH media stream to be played from the server by sending two acquisition requests.

As shown in FIG. 3, in the method for DASH media streaming provided in the embodiment of the present disclosure, the operation 101 includes the following sub-operations.

At 1011, the first MPD file is acquired from the server by sending a first MPD request to the server.

Specifically, the client first sends the first MPD request for acquiring the first MPD file to the server when requesting the server for playing the DASH media stream. The server generates the first MPD file provided to the client for the DASH media stream according to the first MPD request. The first MPD file includes media presentation description information for the first n media slice files of the DASH media stream played on the client, such as file names, file numbers, and the like of the media slice files.

The encapsulation format of the first MPD file may be xml format.

At 1012, a first initialization file is acquired from the server by sending a first media initialization request to the server, and the first initialization file is an MP4 format file including contents of the media initialization file and the first media slice file.

In the DASH protocol, the media initialization file and the media slice file are both MP4 format files. Therefore, the media initialization file and the first media slice file are able to be concatenated to form a new MP4 format file, i.e., the first initialization file, for convenient provision to the client.

The first initialization file includes two box structures that respectively store the contents of the media initialization file and the first media slice file. The process of constructing the first initialization file by the server is described in detail in subsequent embodiments, and details are not described herein.

The client is able to immediately start rendering the first frame of the DASH media stream after acquiring the first initialization file and decoding the first media slice file based on the media initialization file, thereby reducing the delay of rendering the first frame and improving the playing effect of the client.

Compared with the existing technologies, in the embodiment of the present disclosure, the client first acquires the first MPD file from the server based on the first MPD request. Then, the client acquires the first initialization file including the media initialization file and the first media slice file from the server based on the first media initialization request, so that all data required to render the first frame of the DASH media stream is quickly requested via two requests, thereby reducing the delay of rendering the first frame, and improving the playing effect of the media stream of the client.

Figure 4:
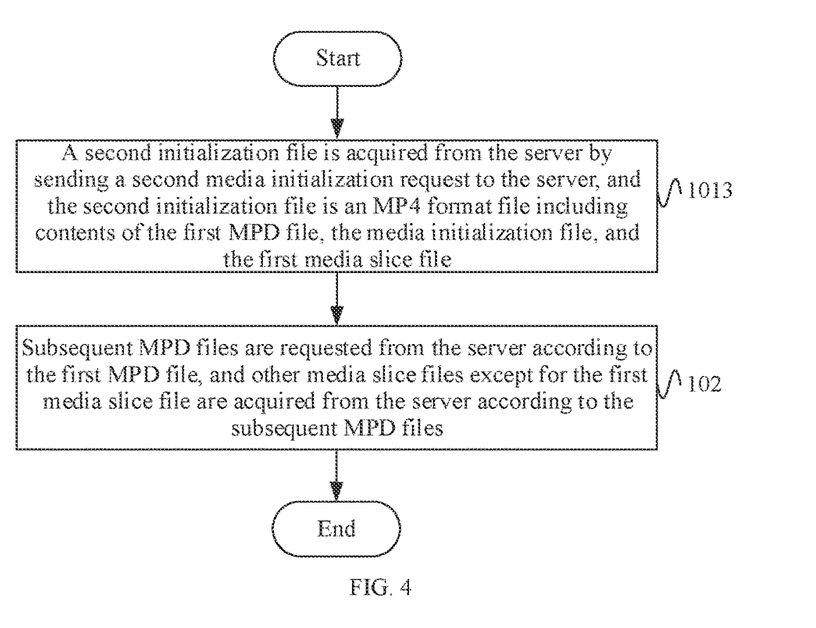
FIG. 4 is a specific flowchart of a method for DASH media streaming according to a third embodiment of the present disclosure.

FIG. 4 is a specific flowchart of a method for DASH media streaming according to a third embodiment of the present disclosure. The third embodiment is an improvement based on the first embodiment in that the client acquires the first MPD file, the media initialization file, and the first media slice file of the DASH media stream to be played from the server by sending one acquisition request.

As shown in FIG. 4, in the method for DASH media streaming provided in the embodiment of the present disclosure, the operation 101 includes the following sub-operations.

At 1013, a second initialization file is acquired from the server by sending a second media initialization request to the server, and the second initialization file is an MP4 format file including contents of the first MPD file, the media initialization file, and the first media slice file.

Specifically, the client only sends the second media initialization request to the server when requesting the server for playing the DASH media stream. The server generates the contents of the first MPD file, the media initialization file, and the first media slice file provided to the client for the DASH media stream based on the second media initialization request. The first MPD file includes media presentation description information for the first n media slice files of the DASH media stream played on the client, such as file names and file numbers of the media slice files.

In the DASH protocol, the MPD file is in xml format. The media initialization file and the media slice file are both MP4 format files. In order to facilitate one-time transmission, the server encapsulates the content of the first MPD file in MP4 format, and then concatenates the first MPD file, the media initialization file and the first media slice file to form a new MP4 format file, i.e., the second initialization file, for convenient provision to the client.

The second initialization file includes three box structures that respectively store the contents of the first MPD file, the media initialization file, and the first media slice file. The process of constructing the second initialization file by the server is described in detail in subsequent embodiments, and details are not described herein.

The client is able to immediately start rendering the first frame of the DASH media stream after acquiring the second initialization file and decoding the first media slice file based on the media initialization file, thereby reducing the delay of rendering the first frame and improving the playing effect of the client.

Compared with the existing technologies, in the embodiment of the present disclosure, the client acquires the second initialization file including the first MPD file, the media initialization file, and the first media slice file from the server based on the second media initialization request, so that all data required to render the first frame of the DASH media stream is quickly requested via one request, thereby reducing the delay of rendering the first frame, and improving the playing effect of the media stream of the client.

Figure 5:
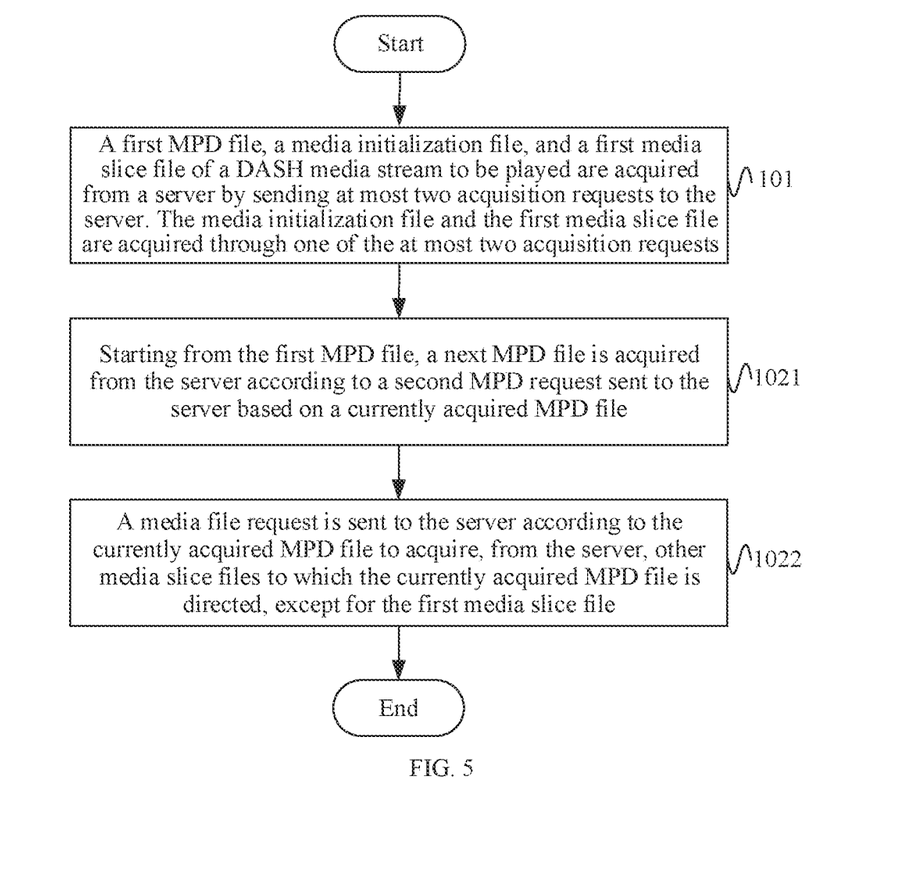
FIG. 5 is a specific flowchart of a method for DASH media streaming according to a fourth embodiment of the present disclosure.

FIG. 5 is a specific flowchart of a method for DASH media streaming according to a fourth embodiment of the present disclosure. The fourth embodiment is an improvement based on any one of the embodiments in which the client is an execution subject, and the improvement is that a process of acquiring subsequent media slice file by the client is refined.

As shown in FIG. 5, in the method for DASH media streaming provided in the embodiment of the present disclosure, the operation 102 includes the following sub-operations.

At 1021, starting from the first MPD file, a next MPD file is acquired from the server according to a second MPD request sent to the server based on a currently acquired MPD file.

Specifically, based on real-time transmission characteristics of DASH media streams in a media live broadcast process, the server needs to generate media slice files and MPD files according to the pull stream progress of the DASH media stream. Therefore, the client acquires the MPD files corresponding to the media slice files in batches. One MPD file may include media presentation description information of a plurality of media slice files played at a current time. In this embodiment, based on the media presentation description information included in the first MPD file, such as names and/or file numbers of the media slice files, the client requests the server to acquire a MPD file including the names and/or the file numbers of the subsequent media slice files that have been sliced. Then a next MPD file is acquired based on the newly acquired MPD file, and so on. In order to distinguish from the request for acquiring the first MPD file, each request for acquiring a non-first MPD file is referred to as a second MPD request in this embodiment.

At 1022, a media file request is sent to the server according to the currently acquired MPD file to acquire, from the server, other media slice files to which the currently acquired MPD file is directed, in addition to the first media slice file.

Specifically, each time a new MPD file is acquired, the client sends a media file request to the server based on the new MPD file to acquire other media slice files to which the new MPD file is directed to, in addition to the first media slice file.

Compared with the existing technologies, in the embodiment of the present disclosure, the client still acquires the subsequent media slice files based on the MPD file after acquiring the first media slice file, so that all data required to render the first frame of the DASH media stream is able to be quickly requested and the delay of rendering the first frame is reduced while the playing effect of the media stream of the client is improved, and well connection with the method of acquiring media slice files based on the MPD file is realized, thereby reducing transformation cost of the conventional method.

In addition, in method for DASH media streaming provided in any of the above embodiments, the method further includes the following operations.
1. After acquiring the media initialization file and the first media slice file, a play operation is performed on the first media slice file based on the media initialization file.
2. After acquiring other media slice files, a play operation is performed on the other media slice files based on the media initialization file.

The acquired media slice file is played in time based on the media initialization file, so that frame data of the DASH media stream is played locally on the client quickly and smoothly, thereby improving the playing effect.

Figure 6:
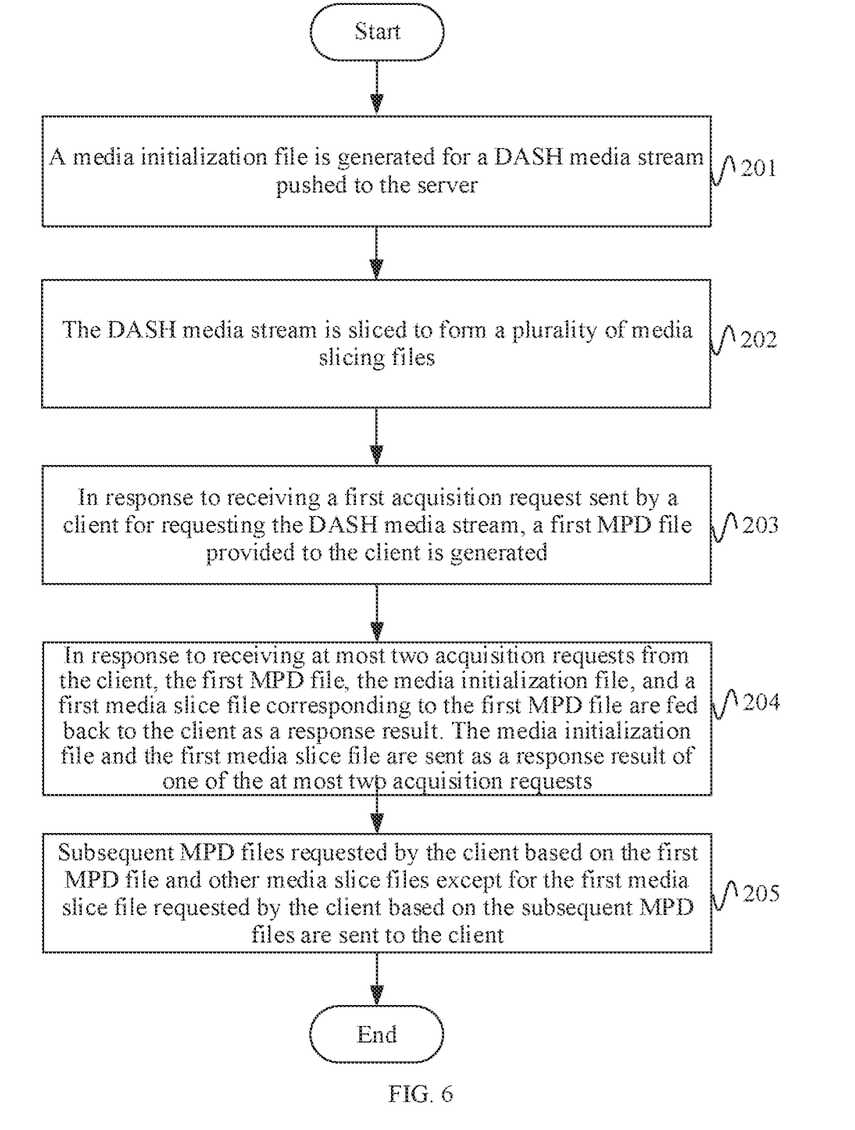
FIG. 6 is a specific flowchart of a method for DASH media streaming according to a fifth embodiment of the present disclosure.

A fifth embodiment of the present disclosure relates to a method for DASH media streaming. The method is applied at a server, which is the server in the above embodiments. As shown in FIG. 6, the method includes the following operations.

At 201, a media initialization file is generated for a DASH media stream pushed to the server.

Specifically, the server generates the media initialization file for the DASH media stream pushed from the background. The media initialization file is generated only once for DASH media streams belonging to the same stream name. The server encapsulates the generated media initialization data in MP4 format for subsequent use. The media initialization file is originally recorded as an init. MP4 file.

At 202, the DASH media stream is sliced to form a plurality of media slicing files.

Specifically, the DASH media stream is sliced according to time nodes of the DASH media stream to form a series of media slice files. Each media slice file corresponds to a unique file name and/or file number.

At 203, in response to receiving a first acquisition request sent by a client for requesting the DASH media stream, a first MPD file provided to the client is generated.

Specifically, when the server receives a first acquisition request sent by the client for requesting the DASH media stream, the server generates the first MPD file including names and/or file numbers corresponding to the plurality of media slice files of the DASH media stream to be currently played according to the live broadcast progress of the current DASH media stream. The format of the first MPD file may be determined according to a request type of the first acquisition request sent by the client, and the request type is related to the predetermined number of requests required by the client to request the first MPD file, the media initialization file, and the first media slice file. For example, when the predetermined number is two, i.e., the first MPD file is separately acquired by the client through one acquisition request, the first MPD file may be in the xml format. When the predetermined number is one, i.e., the first MPD file is acquired by the client as a whole with the media initialization file and the first media slice file through one acquisition request, the first MPD file may be in the MP4 format.

At 204, in response to receiving at most two acquisition requests from the client, the first MPD file, the media initialization file, and a first media slice file corresponding to the first MPD file are fed back to the client as a response result. The media initialization file and the first media slice file are sent as a response result of one of the at most two acquisition requests.

Specifically, when the client requests the server for playing the DASH media stream, the conventional method (i.e., it takes five HTTP requests to get all the data used to render the first frame) is simplified, and a method of acquiring the first MPD file, the media initialization file, and the first media slice file from the server by sending at most two acquisition requests is used. The media initialization file and the first media slice file are acquired through one acquisition request. Accordingly, based on the requests from the client, the server carries the three types of data in a response result by the same number of responses as the number of acquisition requests. For example, when the server feeds back both the media initialization file and the first media slice file to the client as one response result, the two files are concatenated, and then the concatenated file is carried in the response.

In this embodiment, an order of the server feeding back the above three types of files after receiving at most two data acquisition requests sent by the client is not limited. In a conventional DASH media streaming process, the MPD file is encapsulated in xml format, and the media initialization file and media slice file are encapsulated in MP4 file. Based on this, the three types of files are able to be concatenated and reorganized in this embodiment according to the encapsulation formats of these three types of files in combination with actual needs, so as to be provided to the client by the at most two responses.

In fact, the client starts to render the first frame of the DASH media stream immediately after obtaining the media initialization file and the first media slice file, thereby reducing the delay of rendering the first frame and improving the playing effect of the client.

At 205, subsequent MPD files requested by the client based on the first MPD file and other media slice files in addition to the first media slice file requested by the client based on the subsequent MPD files are sent to the client.

Specifically, the server receives requests from the client to acquire subsequently required MPD files according to the first MPD file after providing the first MPD file to the client. For example, the client requests, according to names and/or file numbers of media slice files included in the first MPD file, a subsequent MPD file including names and/or file numbers of subsequent media slice files from the server. After receiving the request to acquire the subsequent MPD file, the server feeds back the subsequent MPD file to the client. The client sends a media request to the server based on each acquired MPD file, and the server extracts, from media slice files that have been generated, media slice files in addition to the first media slice file corresponding to the MPD file and feeds back the media slice files to the client after receiving the media request.

Compared with the existing technologies, in the embodiment of the present disclosure, the server generates the media initialization file and the media slice files for the DASH media stream pushed to the local. When the first acquisition request sent by the client for requesting the DASH media stream is received, the first MPD file provided to the client is generated, and the first MPD file, the media initialization file, and the first media slice file corresponding to the first MPD file are fed back to the client as a response result in response to receiving at most two acquisition requests from the client, so that the client is able to quickly obtain data of files required for rendering the first frame of the DASH media stream, thereby supporting the play operation of the client on media data of the first frame. Then, subsequent MPD files requested by the client based on the first MPD file and other media slice files in addition to the first media slice file which are requested by the client according to the subsequent MPD files are sent to the client, so as to implement a process of providing subsequent DASH media stream data to the client, thereby supporting the play operation of the client on media data of the non-first frame. In this technical solution, all the data required to render the first frame of the DASH media stream is quickly fed back to the client based on a relatively small number of requests, so as to reduce the delay of rendering the first frame and improve the playing effect of the media streams of the client. Meanwhile, with the first MPD file, conventional DASH media stream acquisition methods are still able to be used, and the client sends other media slice files in addition to the first media slice file to the client according to the requests initiated by the client based on the acquired MPD files, so that transformation cost of the conventional acquisition methods are reduced.

Figure 7:
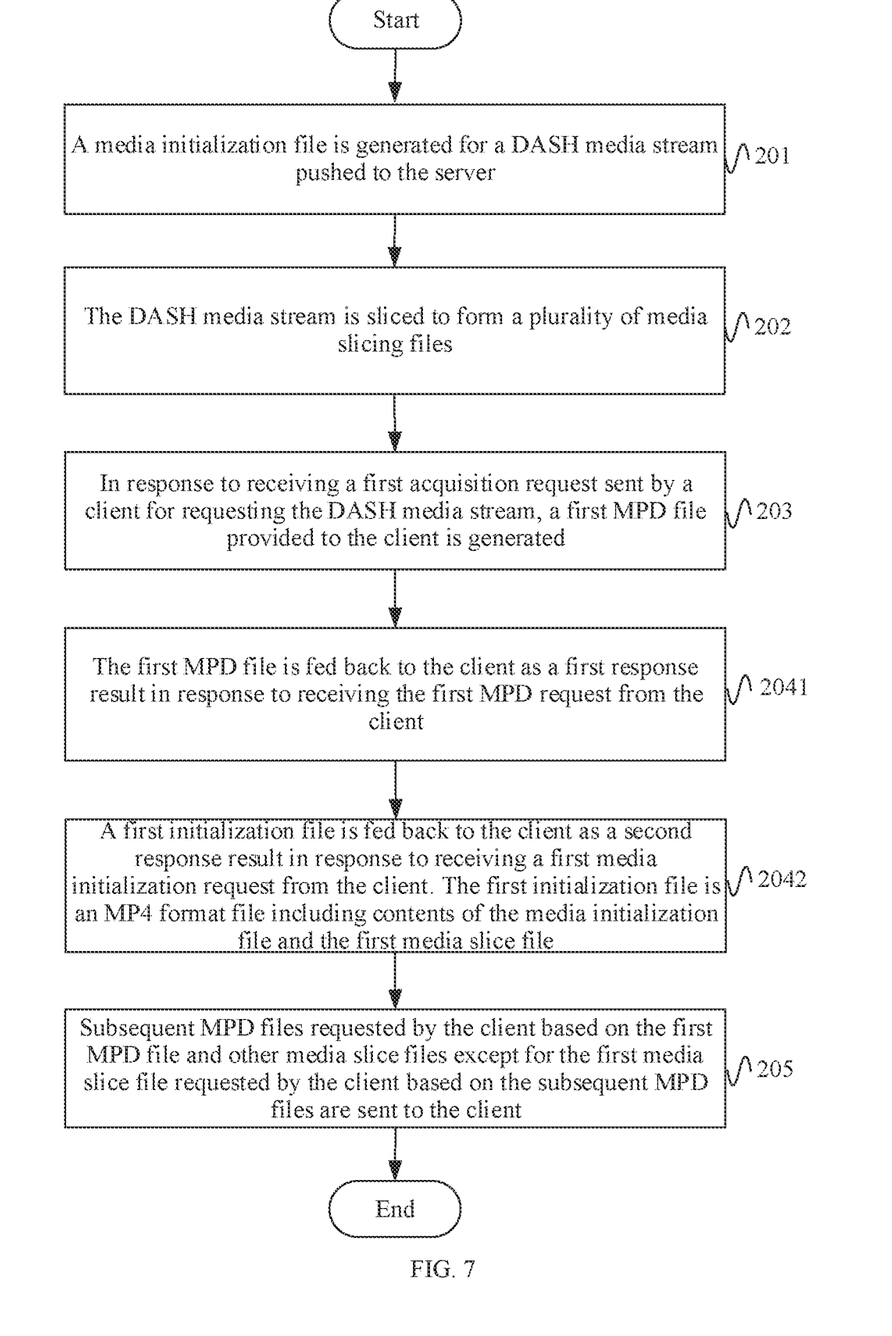
FIG. 7 is a specific flowchart of a method for DASH media streaming according to a sixth embodiment of the present disclosure.

FIG. 7 is a specific flowchart of a method for DASH media streaming according to a sixth embodiment of the present disclosure. The sixth embodiment is an improvement based on the fifth embodiment in that the first MPD file, the media initialization file, and the first media slice file of the DASH media stream to be played are provided to the client based on two acquisition requests sent by the client.

As shown in FIG. 7, in the method for DASH media streaming provided in the embodiment of the present disclosure, the first acquisition request is a first MPD request, and the operation 204 includes the following sub-operations.

At 2041, the first MPD file is fed back to the client as a first response result in response to receiving the first MPD request from the client.

Specifically, the client first sends the first MPD request for acquiring the first MPD file to the server when requesting the server for playing the DASH media stream. The server generates the first MPD file provided to the client for the DASH media stream according to the first MPD request. The first MPD file includes media presentation description information for the first n media slice files of the DASH media stream played on the client, such as file names, file numbers, and the like of the media slice files.

The encapsulation format of the first MPD file may be xml format.

At 2042, a first initialization file is fed back to the client as a second response result in response to receiving a first media initialization request from the client. The first initialization file is an MP4 format file including contents of the media initialization file and the first media slice file.

In the DASH protocol, the media initialization file and the media slice file are both MP4 format files. Therefore, the server concatenates the media initialization file and the first media slice file to form a new MP4 file, i.e., the first initialization file, and then feeds back the first initialization file to the client as a second response result.

The server constructs the first initialization file after receiving a first media initialization request from the client, and the constructed first initialization file includes two box structures that respectively store the contents of the media initialization file and the first media slice file.

A specific construction process is described as follows.

A new self-defined box named 'wsstart-box' is extended from a box structure of an existing mp4 file (e.g., an audio-video initial file 'init.mp4'). wsstart-box is configured to store the contents of the first media slice file. In this way, information of the wsstart-box is able to be added to the existing audio-video initial file 'init.mp4'. When the audio-video initial file 'init.mp4' is acquired, the first media slice file is also acquired without an additional HTTP request to acquire the contents of the first media slice file, thus saving one HTTP request. In this embodiment, an init.mp4 file formed by adding the contents of the first media slice file to the original audio-video initial file 'init.mp4' is used as the first initialization file described above.

Specifically, the wsstart-box includes five fields, i.e., type, size, filename, mediadata, and mandatory. The field 'type' is configured to indicate a type of the box, with a value of 'wsstart', indicating the first media slice file. The field 'size' is configured to indicate an actual size of the box. The field 'filename' is configured to store a file name of the first media slice file. The field 'mediadata' is configured to store contents of the first media slice file. The field 'mandatory' is configured to indicate whether the box is required by the mp4 file, and it indicates that the box is not required when a default value is false.

The client is able to immediately start rendering the first frame of the DASH media stream after acquiring the first initialization file and decoding the first media slice file based on the media initialization file in the first initialization file, thereby reducing the delay of rendering the first frame and improving the playing effect of the client.

Compared with the existing technologies, in the embodiment of the present disclosure, the server provides the first MPD file to the client based on the first MPD request sent by the client first. Then, the server provides the first initialization file including the media initialization file and the first media slice file to the client based on the first media initialization request sent by the client, so that all data required to render the first frame of the DASH media stream is quickly provided to the client via two requests sent by the client, thereby reducing the delay of rendering the first frame, and improving the playing effect of the media stream of the client.

Figure 8:
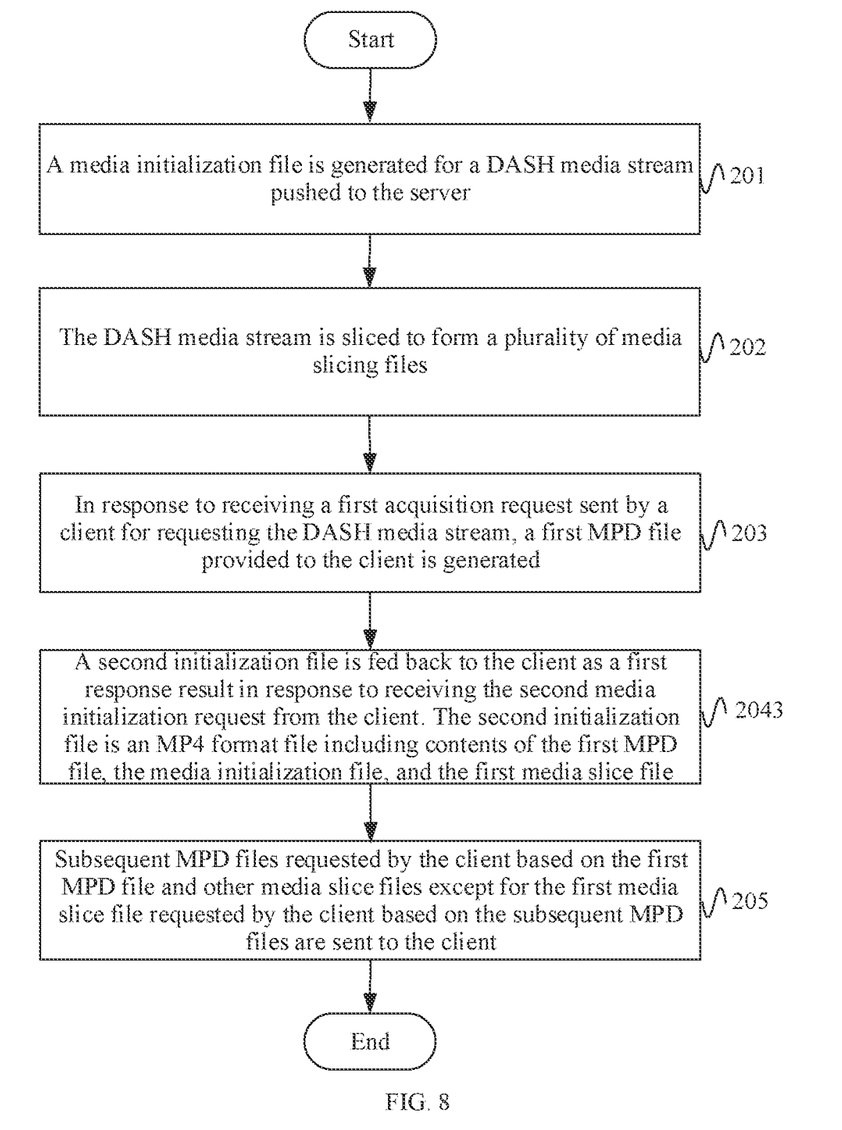
FIG. 8 is a specific flowchart of a method for DASH media streaming according to a seventh embodiment of the present disclosure.

FIG. 8 is a specific flowchart of a method for DASH media streaming according to a seventh embodiment of the present disclosure. The seventh embodiment is an improvement based on the fifth embodiment in that the first MPD file, the media initialization file, and the first media slice file of the DASH media stream to be played are provided to the client based on one acquisition request sent by the client.

As shown in FIG. 8, in the method for DASH media streaming provided in the embodiment of the present disclosure, the first acquisition request is a second media initialization request, and the operation 204 includes the following sub-operations.

At 2043, a second initialization file is fed back to the client as a first response result in response to receiving the second media initialization request from the client. The second initialization file is an MP4 format file including contents of the first MPD file, the media initialization file, and the first media slice file.

Specifically, the client only sends the second media initialization request to the server when requesting the server for playing the DASH media stream. The server generates the contents of the first MPD file, the media initialization file, and the first media slice file provided to the client for the DASH media stream based on the second media initialization request. The first MPD file includes media presentation description information for the first n media slice files of the DASH media stream played on the client, such as file names and file numbers of the media slice files.

In the DASH protocol, the MPD file is in xml format. The media initialization file and the media slice file are both MP4 format files. In order to facilitate one-time transmission, the server encapsulates the content of the first MPD file in MP4 format, and then concatenates the first MPD file, the media initialization file and the first media slice file to form a new MP4 format file, i.e., the second initialization file, for convenient provision to the client.

The server constructs the second initialization file after receiving the second media initialization request from the client. The constructed second initialization file includes three box structures that respectively store the contents of the first MPD file, the media initialization file, and the first media slice file.

A specific construction process is described as follows.

Two new self-defined boxes named wsmpd-box' and 'wsstart-box' are extended from a box structure of an existing mp4 file (e.g., an audio-video initial file 'init.mp4'). wsmpd-box is configured to store the contents of the first MPD file. wsstart-box is configured to store the contents of the first media slice file. In this way, information of the wsmpd-box and wsstart-box is able to be added to the existing audio-video initial file 'init.mp4'. When the audio-video initial file 'init.mp4' is acquired, the first MPD file and the first media slice file are also acquired without additional two HTTP requests to acquire the contents of the first MPD file and the first media slice file, thus saving two HTTP requests. In this embodiment, an init.mp4 file formed by adding the contents of the first MPD file and the first media slice file to the original audio-video initial file 'init.mp4' is used as the second initialization file described above.

Specifically, the wsmpd-box includes four fields, i.e., type, size, content, and mandatory. The field 'type' is configured to indicate a type of the box, with a value of 'wsmpd', indicating the first MPD file. The field 'size' is configured to indicate an actual size of the box. The field 'content' is configured to store contents of the first MPD file. The field 'mandatory' is configured to indicate whether the box is required by the mp4 file, and it indicates that the box is not required when a default value is false.

For the fields included in wsstart-box, refer to the related contents described above, and details are not repeated herein.

The client is able to immediately start rendering the first frame of the DASH media stream after acquiring the second initialization file and decoding the first media slice file based on the media initialization file, thereby reducing the delay of rendering the first frame and improving the playing effect of the client.

Compared with the existing technologies, in the embodiment of the present disclosure, the server provides the client with the second initialization file including the first MPD file, the media initialization file, and the first media slice file based on the second media initialization request sent by the client, so that all data required to render the first frame of the DASH media stream is quickly provided to the client via one request sent by the client, thereby reducing the delay of rendering the first frame, and improving the playing effect of the media stream of the client.

Figure 9:
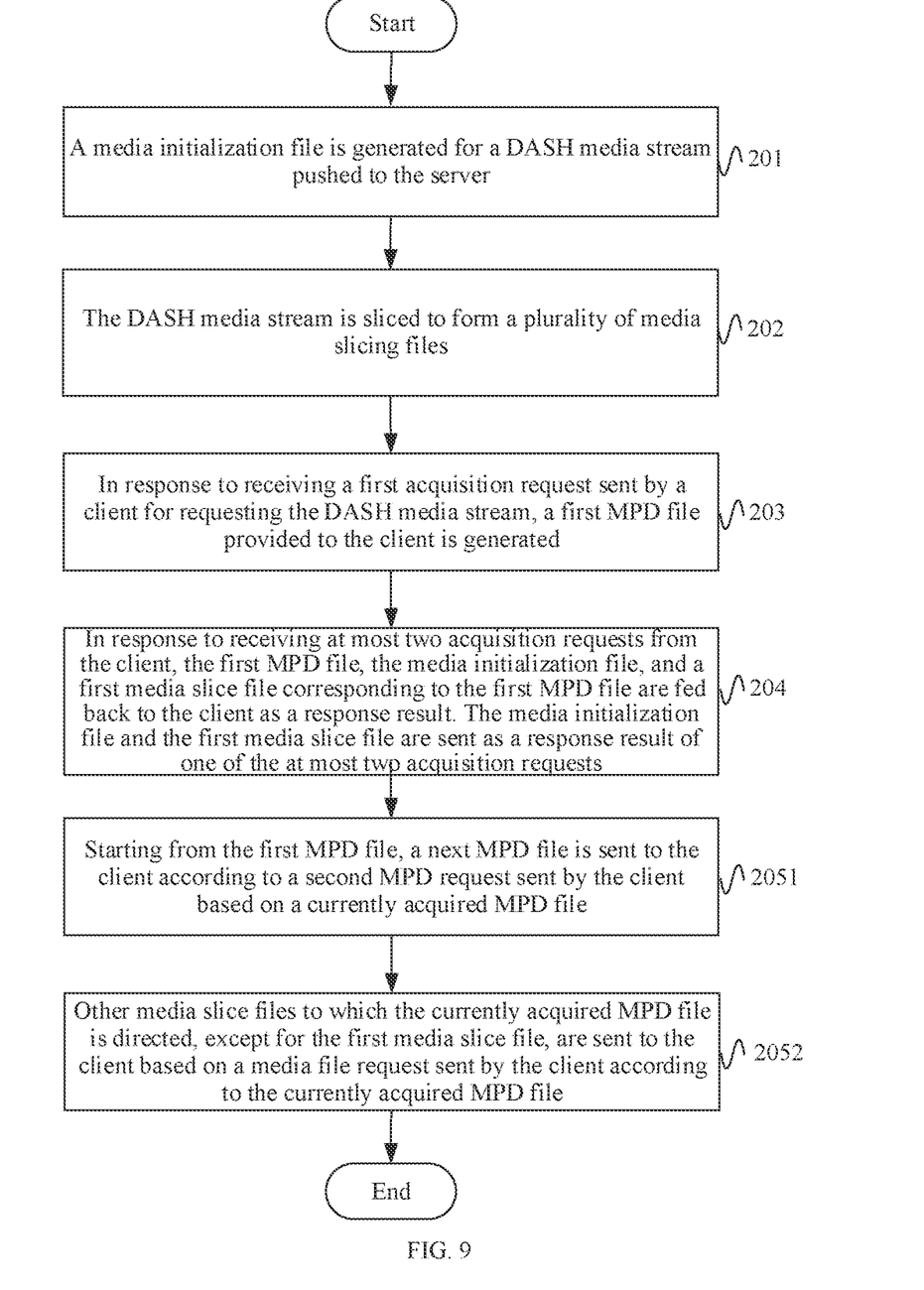
FIG. 9 is a specific flowchart of a method for DASH media streaming according to an eighth embodiment of the present disclosure.

FIG. 9 is a specific flowchart of a method for DASH media streaming according to an eighth embodiment of the present disclosure. The eighth embodiment is an improvement based on any one of the embodiments in which the server is an execution subject, and the improvement is that a process of providing subsequent media slice files by the server is refined.

As shown in FIG. 9, in the method for DASH media streaming provided in the embodiment of the present disclosure, the operation 205 includes the following sub-operations.

At 2051, starting from the first MPD file, a next MPD file is sent to the client according to a second MPD request sent by the client based on a currently acquired MPD file.

Specifically, based on the real-time transmission characteristics of the DASH media stream in a media live broadcast process, the server needs to generate media slice files and MPD files according to the pull stream progress of the DASH media stream. Therefore, the server provides the MPD files corresponding to the media slice files to the client in batches. One MPD file may include media presentation description information of a plurality of media slice files played at a current time. In this embodiment, in response to receiving the MPD request sent by the client after acquiring the media presentation description information included in the first MPD file, such as names and/or file numbers of the media slice files, the server provides the client with a MPD file including the names and/or the file numbers of the subsequent media slice files that have been sliced. Then, the server provides a next MPD file to the client based on the MPD request sent by the client after acquiring the newly acquired MPD file, and so on. In order to distinguish from the request for acquiring the first MPD file, each request for acquiring a non-first MPD file is referred to as a second MPD request in this embodiment.

At 2052, other media slice files to which the currently acquired MPD file is directed, in addition to the first media slice file, are sent to the client based on a media file request sent by the client according to the currently acquired MPD file.

Specifically, each time a new MPD file is acquired, the client sends a media file request to the server based on the new MPD file. The server provides, based on these media file requests, to the client other media slice files to which these MPD files are directed to, in addition to the first media slice file.

Compared with the existing technologies, in the embodiment of the present disclosure, the server still provides subsequent media slice files requested by the client based on the MPD file after providing the first media slice file to the client, so that all data required to render the first frame of the DASH media stream is able to be quickly provided to the client and the delay of rendering the first frame is reduced while the playing effect of the media stream of the client is improved, and well connection with the method of acquiring media slice files based on the MPD file is realized, thereby reducing transformation cost of the conventional method.

Figure 10:
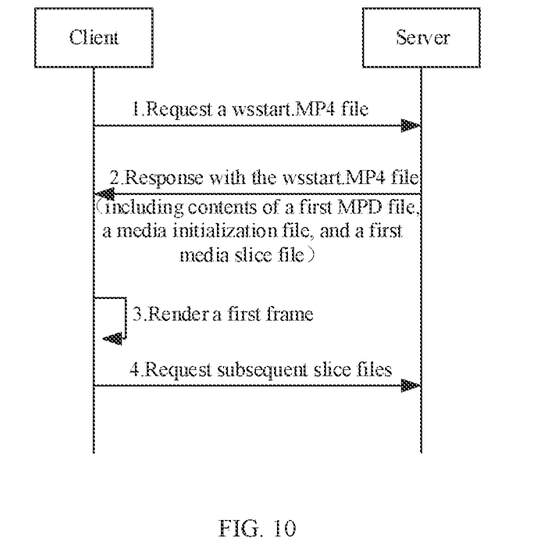
FIG. 10 is a signaling flowchart of a method for DASH media streaming according to an eighth embodiment of the present disclosure.

FIG. 10 is a signaling flowchart of a method for DASH media streaming shown in FIG. 8. A playing procedure of a media stream is as follows: 1. the client first requests a wsstart.MP4 file (i.e., the "second media initialization file"), 2. then respectively requests corresponding video slice files and audio slice files, such as video-1.mp4, audio-1.mp4, video-2.mp4 and audio-2.mp4, . . . , according to the contents of the first MPD file. In other words, the client needs only one HTTP request to render the first frame of the DASH media stream, which reduces the delay of rendering the first frame and improves the playing effect of the media stream of the client.

Figure 11:
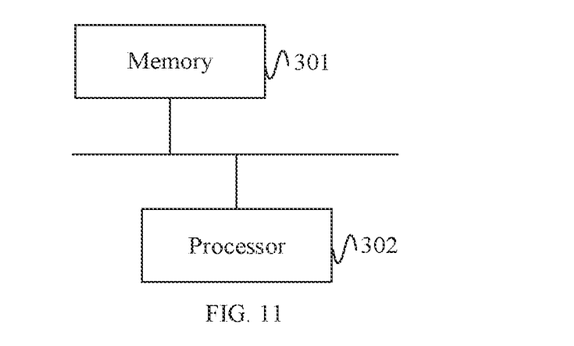
FIG. 11 is a schematic structural diagram of an electronic device according to the fourth embodiment of the present disclosure.

A ninth embodiment of the present disclosure relates to an electronic device. As shown in FIG. 11, the electronic device includes at least one processor 302 and memory 301 communicatively coupled to the at least one processor 302. The memory 301 stores instructions executable by the at least one processor 302 which, when executed by the at least one processor 302, cause the at least one processor 302 to perform any one of the method embodiments shown in FIGS. 2 to 5, where the electronic device serves as a client, or, perform any one of the method embodiments shown in FIGS. 6 to 10, where the electronic device serves as a server.

The memory 301 and the at least one processor 302 are connected by means of bus, the bus may include any number of interconnected buses and bridges, and the bus connect various circuits of the at least one processor 302 and the memory 301 together. The bus may also connect together various other circuits such as peripheral devices, voltage regulators, and power management circuits, all of which are well known in the art, and therefore are not further described herein. A bus interface provides an interface between the bus and a transceiver. The transceiver may be an element or a plurality of elements, such as a plurality of receivers and transmitters for providing units for communicating with various other devices on a transmission medium. The data processed by the at least one processor 302 is transmitted over a wireless medium via antennas, and the antennas further receive the data and transmit the data to the at least one processor 302.

The at least one processor 302 is responsible for managing the bus and general processing, and may also provide various functions, including timing, peripheral interfaces, voltage regulation, power management, and other control functions. The memory 301 may be configured to store data used by the at least one processor 302 in performing operations.

A tenth embodiment of the present disclosure relates to a non-transitory computer readable storage medium storing a computer program. Any of the above method embodiments is implemented when the computer program is executed by at least one processor.

That is, it should be understood by those skilled in the art that all or a portion of the operations in the method embodiments described above may be implemented by a program instructing relevant hardware. The program is stored in a storage medium, which includes several instructions to cause a device (which may be a single chip microcomputer, a chip, or the like) or a processor to perform all or a portion of the operations of the method in the embodiments described herein. The foregoing storage medium includes a USB flash drive, a removable hard disk, read-only memory (ROM), random access memory (RAM), a magnetic disk, an optical disk, or any other medium that is able to store program codes.

Those of ordinary skill in the art should appreciate that the above embodiments are specific embodiments of the present disclosure, and that various changes may be made in form and detail in practical application without departing from the spirit and scope of the present disclosure.

What is claimed is:

1. A method for dynamic adaptive streaming over HTTP (DASH) media streaming, applied at a client, comprising:
   acquiring a first media presentation description (MPD) file, a media initialization file, and a first media slice file of a DASH media stream to be played from a server by sending at most two acquisition requests to the server, wherein the media initialization file and the first media slice file are requested through one of the at most two acquisition requests;
   requesting subsequent MPD files from the server according to the first MPD file; and
   acquiring other media slice files in addition to the first media slice file from the server according to the subsequent MPD files.

2. The method according to claim 1, wherein acquiring the first MPD file, the media initialization file, and the first media slice file of the DASH media stream to be played from the server by sending the at most two acquisition requests to the server comprises:
   acquiring the first MPD file from the server by sending a first MPD request to the server; and
   acquiring a first initialization file from the server by sending a first media initialization request to the server, wherein the first initialization file is an MP4 format file including contents of the media initialization file and the first media slice file.

3. The method according to claim 2, wherein the first initialization file comprises two box structures that respectively store the contents of the media initialization file and the first media slice file.

4. The method according to claim 1, wherein acquiring the first MPD file, the media initialization file, and the first media slice file of the DASH media stream to be played from the server by sending the at most two acquisition requests to the server comprises:
   acquiring a second initialization file from the server by sending a second media initialization request to the server, wherein the second initialization file is an MP4 format file including contents of the first MPD file, the media initialization file, and the first media slice file.

5. The method according to claim 4, wherein the second initialization file comprises three box structures that respectively store the contents of the first MPD file, the media initialization file, and the first media slice file.

6. The method according to claim 1, wherein requesting subsequent MPD files from the server according to the first MPD file, and acquiring other media slice files in addition to the first media slice file from the server according to the subsequent MPD files comprises:
   acquiring, starting from the first MPD file, a next MPD file from the server according to a second MPD request sent to the server based on a currently acquired MPD file; and
   sending a media file request to the server according to the currently acquired MPD file to acquire, from the server, other media slice files to which the currently acquired MPD file is directed, in addition to the first media slice file.

7. The method according to claim 1, further comprising:
   performing a play operation on the first media slice file based on the media initialization file after acquiring the media initialization file and the first media slice file.

8. The method according to claim 7, further comprising:
   performing play operations on the other media slice files based on the media initialization file after acquiring the other media slice files.

9. A method for dynamic adaptive streaming over HTTP (DASH) media streaming, applied at a server, comprising:
   generating a media initialization file for a DASH media stream pushed to the server;
   slicing the DASH media stream to form a plurality of media slicing files;
   in response to receiving a first acquisition request sent by a client for requesting the DASH media stream, generating a first media presentation description (MPD) file provided to the client;
   in response to receiving at most two acquisition requests from the client, feeding back the first MPD file, the media initialization file, and a first media slice file corresponding to the first MPD file to the client as a response result, wherein the media initialization file and the first media slice file are sent as a response result of one of the at most two acquisition requests; and
   sending to the client subsequent MPD files requested by the client based on the first MPD file and other media slice files in addition to the first media slice file requested by the client based on the subsequent MPD files.

10. The method according to claim 9, wherein the first acquisition request is a first MPD request, and feeding back the first MPD file, the media initialization file, and the first media slice file corresponding to the first MPD file to the client as the response result in response to receiving at most two acquisition requests from the client comprises:
   feeding back the first MPD file to the client as a first response result in response to receiving the first MPD request from the client; and
   feeding back a first initialization file to the client as a second response result in response to receiving a first media initialization request from the client, wherein the first initialization file is an MP4 format file including contents of the media initialization file and the first media slice file.

11. The method according to claim 10, further comprising, after receiving the first media initialization request from the client:
   constructing the first initialization file, wherein the first initialization file comprises two box structures that respectively store the contents of the media initialization file and the first media slice file.

12. The method according to claim 9, wherein the first acquisition request is a second media initialization request, and feeding back the first MPD file, the media initialization file, and the first media slice file corresponding to the first MPD file to the client as the response result in response to receiving at most two acquisition requests from the client comprises:

feeding back a second initialization file to the client as a first response result in response to receiving the second media initialization request from the client, wherein the second initialization file is an MP4 format file including contents of the first MPD file, the media initialization file, and the first media slice file.

13. The method according to claim 12, further comprising, after receiving the second media initialization request from the client:

constructing the second initialization file, wherein the second initialization file comprises three box structures that respectively store the contents of the first MPD file, the media initialization file, and the first media slice file.

14. The method according to claim 9, wherein sending to the client subsequent MPD files requested by the client based on the first MPD file and other media slice files in addition to the first media slice file requested by the client based on the subsequent MPD files comprises:

sending, starting from the first MPD file, a next MPD file to the client according to a second MPD request sent by the client based on a currently acquired MPD file; and sending to the client other media slice files to which the currently acquired MPD file is directed, in addition to the first media slice file, based on a media file request sent by the client according to the currently acquired MPD file.

15. An electronic device comprising:
at least one processor; and
a memory communicatively coupled to the at least one processor;
wherein the memory stores instructions executable by the at least one processor, and the instructions when executed by the at least one processor enable the at least one processor to perform a method for dynamic adaptive streaming over HTTP (DASH) media streaming, and wherein the electronic device serves as a client;
wherein the method comprises:
acquiring a first media presentation description (MPD) file, a media initialization file, and a first media slice file of a DASH media stream to be played from a server by sending at most two acquisition requests to the server, wherein the media initialization file and the first media slice file are requested through one of the at most two acquisition requests;

requesting subsequent MPD files from the server according to the first MPD file; and
acquiring other media slice files in addition to the first media slice file from the server according to the subsequent MPD files.

16. The electronic device according to claim 15, wherein acquiring the first MPD file, the media initialization file, and the first media slice file of the DASH media stream to be played from the server by sending the at most two acquisition requests to the server comprises:

acquiring the first MPD file from the server by sending a first MPD request to the server; and acquiring a first initialization file from the server by sending a first media initialization request to the server, wherein the first initialization file is an MP4 format file including contents of the media initialization file and the first media slice file.

17. The electronic device according to claim 16, wherein the first initialization file comprises two box structures that respectively store the contents of the media initialization file and the first media slice file.

18. The electronic device according to claim 15, wherein acquiring the first MPD file, the media initialization file, and the first media slice file of the DASH media stream to be played from the server by sending the at most two acquisition requests to the server comprises:

acquiring a second initialization file from the server by sending a second media initialization request to the server, wherein the second initialization file is an MP4 format file including contents of the first MPD file, the media initialization file, and the first media slice file.

19. The electronic device according to claim 18, wherein the second initialization file comprises three box structures that respectively store the contents of the first MPD file, the media initialization file, and the first media slice file.

20. The electronic device according to claim 15, wherein requesting subsequent MPD files from the server according to the first MPD file, and acquiring other media slice files in addition to the first media slice file from the server according to the subsequent MPD files comprises:

acquiring, starting from the first MPD file, a next MPD file from the server according to a second MPD request sent to the server based on a currently acquired MPD file; and sending a media file request to the server according to the currently acquired MPD file to acquire, from the server, other media slice files to which the currently acquired MPD file is directed, in addition to the first media slice file.

* * * * *